United States Patent Office 3,629,194
Patented Dec. 21, 1971

3,629,194
POLYOLEFINS STABILIZED WITH MERCAPTO ACID ESTERS
Akiyoshi Onishi, Yokkaichi, and Naohiko Fukuoka, Kobe, Japan, assignors to Mitsubishi Petrochemical Company Limited, Tokyo-to, and Shipro Kasei Kaisha Limited, Osaka-shi, Osaka-fu, Japan
No Drawing. Filed June 8, 1970, Ser. No. 44,656
Claims priority, application Japan, June 11, 1969, 44/45,912; Nov. 15, 1969, 44/91,184; Dec. 27, 1969, 45/104,890, 45/104,891, 45/104,892; Mar. 31, 1970, 45/27,132, 45/27,133
Int. Cl. C08f 45/58
U.S. Cl. 260—45.85
7 Claims

ABSTRACT OF THE DISCLOSURE

Polyolefin resin compositions each stabilized against thermal aging, which compositions each contains a stabilizing amount of an ester of alkylthio-propionic or alkylthio-butyric acid with a polyol, the polyol being limited to five groups, singly or in combination with a phenolic antioxidant.

BACKGROUND OF THE INVENTION

This invention relates generally to polyolefin resin compositions which are stabilized against thermal aging or degradation.

Polyolefin resins have inherent good mechanical properties and are useful as resin materials for molded articles, films and fibers. These resins, however, could not heretofore exhibit their full usefulness because of their susceptibility to oxidative degradation when they are subjected to heated conditions in the presence of air, this drawback also being inherent in these resins. While various antioxidants or stabilizers have heretofore been proposed for overcoming this drawback, it cannot be said that they are completely satisfactory.

SUMMARY OF THE INVENTION

It is an object of this invention to provide polyolefin resin compositions which are endowed with improved stability against thermal aging or degradation, thereby to afford a solution to a certain extent to the problem stated above.

The foregoing and other objects have been achieved by the provision of polyolefin resin compositions which contain a stabilizing amount of a certain stabilizer. This stabilizer is at least one of certain sulfur- containing organic ester compounds in one aspect of the invention, and is a combination of the ester compound with a phenolic antioxidant in another aspect of the invention. In the latter case, a prominent synergistic effect is observable.

DETAILED DESCRIPTION

The sulfur-containing organic ester, which is a sole component or one of components of the stabilizer according to the present invention, is selected from the esters of an acid having the general formula:

R—S—$C_nH_{2n}$—COOH      (I)

in which R is an alkyl containing 8 to 30 carbon atoms and $n$ is an integer from 2 to 3, with a polyol compound selected from the group consisting of:

(1) polyols having the general formula:

HO—R'—OH      (II)

in which R' is an alkylene containing 2 to 12 carbon atoms, said ester having the formula:

R—$SC_nH_{2n}$COOR'—OOC$C_nH_{2n}$S—R—

(2) polyols having the general formula:

HO—$C_mH_{2m}$—S—$C_mH_{2m}$—OH      (III)

in which each $m$ is an integer from 2 to 3,
said ester having the formula:

R—$SC_nH_{2n}$COO$C_mH_{2m}$S—$CH_{2m}$OOC$C_nH_{2n}$S—R—

(3) polyols having the general formula:

(IV)

in which R" is an alkyl containing 1 to 20 carbon atoms,
said ester having the formula:

R"C$(CH_2OX)_3$ wherein X is hydrogen or R—$SC_nH_{2n}$CO as defined by Formula I with at least one X being R—$SC_nH_{2n}$CO.

(4) glycerine,
said ester having the formula:

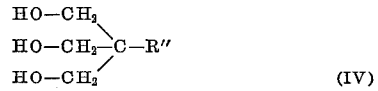

wherein X is hydrogen or R—$SC_nH_{2n}$CO as defined by Formula I with at least one X being R—$SC_nH_{2n}$CO—, and (5) pentaerythritol,
said ester having the formula:

C$(CH_2OX)_4$ wherein X is hydrogen or R—$SC_nH_{2n}$Co—as defined by Formula I with at least one X being R—$SC_nH_{2n}$CO— the R and R' and R" moieties in one compound being the same or different.

The acid component of the ester is alkylthio-propionic or-butyric acid defined by the Formula I. The number of carbon atoms in the alkyl "R" is of some importance. In the case where the alkyl is excessively lower, loss of the ester due to vaporization tends to occur when the ester is subjected to heat, for example, when it is incorporated with a polyolefin resin. In the case where the alkyl is excessively higher, the ester tends to become less compatible with a polyolefin resin. While the upper limit of the number of carbon atoms in the alkyl R is not very critical, the lower limit thereof is of significance in that the stabilizing effect of the esters seems to depend partly on the amount of carbon atoms in the alkyl R. For example, an ester of the acid in which "R" is hydrogen has little or no stabilizing effect on polyolefin resins when used singly. Preferably, the alkyl "R" contains carbon atoms of a number of the order of 8 to 20. The alkyl "R" and the alkylene —$C_nH_{2n}$— can be straight or branched.

Representative examples of the acids include:

3-octylthiopropionic acid
3-dodecylthiopropionic acid
3-tridecylthiopropionic acid
3-tetradecylthiopropionic acid
3-tetradecylthiopropionic acid
3-octylthiobutyric acid
3-dodecylthiobutyric acid
3-tridecylthiobutyric acid
3-tetradecylthiobutyric acid
3-octadecylthiobutyric acid
3-octylthioisobutyric acid 3-dodecylthioisobutyric acid
3-octadecylthioisobutyric acid
4-octylthiobutyric acid
4-tridecylthiobutyric acid
4-hexadecylthiobutyric acid
4-octadecylthiobutyric acid The esters to be used as a stabilizer can be classified into the following five groups depending on the types of the alcohols.

(1) Esters of a polyol of the formula:

$$HO-R'-OH \qquad (II)$$

The alkylene R' can be straight or branched.

These esters are diesters in which both hydroxyls are esterified by the acid stated hereinbefore.

Representative examples of these esters include:

ethylene-bis(3-dodecylthiopropionate)
ethylene-bis(3-octadecylthiopropionate)
tetramethylene-bis(3-dodecylthiopropionate)
tetramethylene-bis(3-octadecylthiopropionate)
pentamethylene-bis(3-dodecylthiopropionate)
pentamethylene-bis(3-octadecylthiopropionate)
heptamethylene-bis(3-dodecylthiopropionate)
heptamethylene-bis(3-octadecylthiopropionate)
octamethylene-bis(3-dodecylthiopropionate)
octamethylene-bis(3-octadecylthiopropionate)
nonamethylene-bis(3-dodecylthiopropionate)
nonamethylene-bis(3-octadecylthiopropionate)
decamethylene-bis(3-dodecylthiopropionate)
decamethylene-bis(3-octadecylthiopropionate)

(2) Esters of a polyol of the formula:

$$HO-C_mH_{2m}-S-C_mH_{2m}-OH \qquad (III)$$

The alkylene $-C_mH_{2m}-$ can be straight or branched. These esters are diesters in which both hydroxyls are esterified by the acid.

Representative examples of the esters include:

bis(ethylene-3-octylthiopropionate)sulfide
bis(ethylene-3-dodecylthiopropionate)sulfide
bis(ethylene-3-tridecylthiopropionate)sulfide
bis(ethylene-3-tetradecylthiopropionate)sulfide
bis(ethylene-3-octadecylthiopropionate)sulfide
ethylene(3-dodecylthiopropionate)sulfide
ethylene(3-octadecylthiopropionate)sulfide
bis(ethylene-4-octylthiobutyrate)sulfide
bis(ethylene-4-dodecylthiobutyrate)sulfide
bis(ethylene-3-octadecylthioisobutyrate)sulfide (3) Esters of a polyol of the formula:

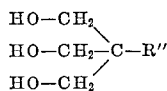

The alkyl R'' can be straight or branched. At least one of three hydroxyl groups is esterified by the acid hereinbefore stated.

The polyols are also called trimethylalkanes, and representative examples of these polyols include:

trimethylolpropane
trimethylolisopropylmethane
trimethylolheptadecane

The esters which can be used in the present compositions are mono-, di- or tri-esters of a trimethylolalkane as described above with an acid such as that listed hereinbefore.

Diesters and triesters are preferably, triesters being more preferable, although monoesters are effective enough. The alkyl R's in a diester or triester can be the same or different.

(4) Esters of glycerine.

The glycerides can be mono-, di-, or triglycerides with an acid such as that listed hereinbefore. Diglycerides and triglycerides are preferable, triglycerides being more preferable, although monoglycerides are effective enough.

(5) Esters of pentaerythritol.

These esters can be mono-, di-, tri-, or tetraesters with an acid such as that listed hereinbefore. Diesters triesters, and tetraesters are preferable, although monoesters are effective enough. The alkyl R's in a diester or higher ester can be the same or different.

These esters are effective by themselves in rendering polyolefin resins resistant to thermal aging or degradation when they are incorporated with the resin. Further and remarkable synergistic or cooperative effects are afforded when the esters are incorporated in combination with a hindered phenolic antioxidant.

The hindered phenolic antioxidants which may be expected to produce these effects are, in general, mono-, or polyhydric phenolic compounds in which at least one of the ortho positions to a hydroxyl group is substituted by an alkyl, aralkyl, or cycloalkyl group.

The substituents preferably contain carbon atoms of a number of the order of 3 to 10, and the alkyl group, inclusive of that in an aralkyl and cycloalkyl groups, can be unsaturated. The phenolic compounds may be further substituted, and the phenolic compounds may be polyphenolic compounds such as bisphenolic, trisphenolic, or tetrakisphenolic compounds in which phenolic nuclei are connected by a connecting group such as an alkylene, a thioether, or a triazinoxyl group.

Representative examples of such hindered phenolic compounds include:

2,6-di-tert.butyl-p-cresol
2,6-di-isobornyl-p-cresol
2,6-bis(1-methyl-1-phenyl-ethyl)-p-cresol
2,6-di-tert.butyl-4-nonylphenol
n-octadecyl-3-(3,5-di-tert.butyl-4-hydroxyphenyl) propionate
2,2'-methylenebis(4-ethyl-6-tert.butylphenol)
2,2'-methylenebis(4-methyl-6-α-methylcyclohexylphenol)
4,4'-thiobis(2-tert.butyl-5-methylphenol)
4,4'-thiobis(2-tert.butyl-6-methylphenol)
4,4'-methylenebis(2-tert.butyl-5-methylphenol)
4,4'-methylenebis(2,6-di-tert.butylphenol)
4,4'-butylidenebis(2-tert.butyl-5-methylphenol)
4,4'-butylidenebis(2-isopropyl-5-methylphenol)
2,4-bis(3,5-di-tert.butyl-4-hydroxyphenoxy)-6-n-octylthio)-1,3,5-triazine
1,3,5-trimethyl-2,4,6-tris(3,5-di-tert.butyl-4-hydroxybenzyl)benzene
1,1,3-tris(5-tert.butyl-4-hydroxy-2-methylphenyl)butane
tetrakis[methylene-3-(3,5-di-tert.-butyl-4-hydroxphenyl) propionate]methane Some of these hindered phenolic compounds, namely, those selected from the group consisting of 2,6-di-tert. butyl-p-cresol, 2,6-di-isobornyl-p-cresol, 2,6-bis(1-methyl-1-phenyl-ethyl)-p-cresol, are expected to be effective in, among others, preventing thermal degradation of polyolefin resins in a working machine.

The amounts of the esters and the phenolic antioxidants to be incorporated to a polyolefin resin are preferably 0.01% or more, more preferably 0.05% or more, based on the weight of the polyolefin resin, respectively. The upper limits of these amounts are not critical. It will not be necessary to add more than 1% except in special cases, since satisfactory results are usually obtainable with an amount of less than 1%.

Polyolefin resins to be stabilized by incorporation therewith of these compounds are homopolymers or copolymers of an olefin such as ethylene, propylene or butene-1, or polymeric mixtures containing the polymer.

Procedures and apparatuses to be employed to incorporate the stabilizer with the resin can be suitably selected according to conventional practice for generally blending an additive such as stabilizers, pigments or fillers into a thermoplastic resin.

The stabilizer of the invention can be used in combination with any other additive compatible therewith, such as organic phosphite esters, UV absorbers, or metallic soap, and the polyolefin resin compositions according to the invention may further contain filler or pigments.

In order to indicate still more fully the nature and utility of the invention, the following examples of preferred embodiment thereof are set forth, it being understood that these examples are presented as illustrative only and that they are not intended to limit the scope of the invention.

Example I-A

The tests in this Example I-A and the following Example I-B are intended to demonstrate the stabilizing activity of the esters of the polyol II employed singly.

Aliquot portions of polypropylene powder which had an intrinsic viscosity of 1.9 measured in tetralin at 135° C. and had an isotactic content approximately 98% were each admixed with a quantity of a stabilizer. The types and quantities based on the resin of each additive are set forth in the following table.

Each admixture was blended in a mixer, and was kneaded and pelletized by means of an extruder whose cylinder temperature was 23° C., $L/D$ was 20, and inner diameter of cylinder was 20 mm. $\phi$.

The pellets thus produced were subjected to compression molding at 230° C. into a form of sheet of 0.5 mm. thickness, which was employed as a test piece.

Resistance to thermal aging was estimated by the time in hours at which the test piece was brittle after being heated at 140° C. in an air-oven.

| Run number | | Stabilizer | Percent | Resistance to thermal aging (hours) |
|---|---|---|---|---|
| Reference | Sample | | | |
| 1 | | None | | <3 |
| | 1 | Ethylene-bis (3-octadecylthiopropionate). | 0.3 | 52 |
| | 2 | Pentamethylene-bis (3-dodecylthiopropionate). | 0.3 | 96 |
| | 3 | Octamethylene-bis (3-dodecylthiopropionate). | 0.3 | 126 |
| | 4 | ...do... | 0.6 | 191 |
| | 5 | ...do... | 0.001 | 7 |
| | 6 | Decamethylene-bis (3-octadecylthiopropionate). | 0.3 | 143 |

Example I-B

Tests similar to those in Example I-A were made on a propylene-ethylene copolymer which had an intrinsic viscosity of 2.3 measured in Tetralin at 135° C. and had an ethylene content of 21% by weight.

| Run number | | Stabilizer | Percent | Resistance to thermal aging (hours) |
|---|---|---|---|---|
| Reference | Sample | | | |
| 2 | | None | | <3 |
| | 7 | Ethylene-bis (3-octadecylthiopropionate). | 0.3 | 50 |
| | 8 | Pentamethylene-bis (3-dodecylthiopropionate). | 0.3 | 89 |
| | 9 | Octamethylene-bis (3-dodecylthiopropionate). | 0.3 | 123 |

Example II-A

Aliquot portions of polypropylene powder which had an intrinsic viscosity of 1.9 measured in Tetralin at 135° C. and had an isotactic content of approximately 98% were each admixed with a quantity of stabilizer. The types and quantities based on the resin of each additives are set forth in the following table.

Each admixture was blended in a mixer, and was kneaded and pelletized by means of an extruder whose cylinder temperature was 230° C., $L/D$ was 20, and inner diameter of cylinder was 20 mm. $\phi$.

The pellets thus produced were subjected to compression molding at 230° C. into a form of sheet of 0.5 mm. thickness, which was employed as a test piece.

Resistance to thermal aging was estimated by the time in hours at which the test piece was brittle after being heated at 140° C. in an air-oven.

| Run Number | | Stabilizer | Percent | Resistance to thermal aging (hours) |
|---|---|---|---|---|
| Reference | Sample | | | |
| 1 | | None | | <3 |
| | 1 | $\left(C_{12}H_{25}-S-CH_2CH_2\overset{O}{\underset{\|}{C}}-O-CH_2\right)_4 C$ | 0.3 | 121 |
| | 2 | $\left(C_{16}H_{27}-S-CH_2CH_2\overset{O}{\underset{\|}{C}}-O-CH_2\right)_4 C$ | 0.3 | 139 |
| | 3 | $\left(C_{18}H_{37}-S-CH_2CH_2\overset{O}{\underset{\|}{C}}-O-CH_2\right)_4 C$ | 0.3 | 187 |
| | 4 | $\left(C_{18}H_{37}-S-CH_2CH_2\overset{O}{\underset{\|}{C}}-O-CH_2\right)_4 C-CH_2OH$ | 0.2 | 134 |
| | 5 | $C_{18}H_{37}-S-CH_2CH_2\overset{O}{\underset{\|}{C}}-O-CH_2-C-(CH_2OH)_3$ | 0.3 | 42 |
| 2 | | n-Octadecyl-3-(3,5-di-tert.butyl-4-hydroxyphenyl) propionate | 0.3 | 136 |
| 3 | | 4,4'-butylidenebis (2-tert.butyl-5-methylphenol) | 0.3 | 123 |
| 4 | | 1,1,3-tris (5-tert.butyl-4-hydroxy-2-methylphenyl) butane | 0.3 | 137 |
| 5 | | 1,3,5-trimethyl-2,4,6-tris (3,5-di-tert.-butyl-4-hydroxybenzyl) benzene. | 0.3 | 239 |

Example II-A—Continued

| Run Number Reference | Sample | Stabilizer | Percent | Resistance to thermal aging (hours) |
|---|---|---|---|---|
| 6 | | Tetrakis [methylene-3-(3,5-di-tert.butyl-4-hydroxyphenyl) propionate] methane. | 0.3 | 1692 |
| | 6 | $(C_{12}H_{25}-S-CH_2CH_2\overset{O}{\overset{\|}{C}}-O-CH_2)_4 C$ <br> n-Octadecyl-3-(3,5-di-tert.butyl-4-hydroxyphenyl) propionate | 0.2 <br> 0.1 | >3,000 |
| 1 | | None | | <3 |
| | 7 | $(C_{18}H_{37}-S-CH_2CH_2\overset{O}{\overset{\|}{C}}-O-CH_2)_4 C$ <br> 4,4'-butylidenebis (2-tert.butyl-5-methylphenol) | 0.2 <br> 0.1 | >3,000 |
| | 8 | $(C_{18}H_{37}-S-CH_2CH_2\overset{O}{\overset{\|}{C}}-O-CH_2)_4 C$ <br> 1,1,3-tris(5-tert.butyl-4-hydroxy-2-methylphenyl)butane | 0.02 <br> 0.1 | >3,000 |
| | 9 | $(C_{18}H_{37}-S-CH_2CH_2\overset{O}{\overset{\|}{C}}-O-CH_2)_3 C-CH_2OH$ <br> 1,3,5-trimethyl-2,4,6-tris (3,5-ditert.butyl-4-hydroxybenzyl) benzene. | 0.2 <br> 0.1 | >3,000 |
| | 10 | $C_{18}H_{37}-S-CH_2CH_2\overset{O}{\overset{\|}{C}}-O-CH_2-C-(CH_2OH)_3$ <br> Tetrakis [methylene-3-(3,5-di-tert.butyl-4-hydroxyphenyl) propionate] methane. | 0.2 <br> 0.1 | >3,000 |

Example II-B

Tests similar to those in Example II-A were made on a propylene-ethylene copolymer which had an intrinsic viscosity of 2.3 measured in tetralin at 135° C. and had an ethylene content of 21% by weight.

| Run Number Reference | Sample | Stabilizer | Percent | Resistance to thermal aging (hours) |
|---|---|---|---|---|
| 7 | | None | | <3 |
| | 11 | $(C_{18}H_{37}-S-CH_2CH_2\overset{O}{\overset{\|}{C}}-O-CH_2)_4 C$ | 0.3 | 183 |
| | 12 | $(C_{18}H_{37}-S-CH_2CH_2\overset{O}{\overset{\|}{C}}-O-CH_2)_3 C-CH_2OH$ | 0.3 | 127 |
| 8 | | 1,1,3-tris (5-tert.butyl-4-hydroxy-2-methylphenyl) butane | 0.3 | 134 |
| 9 | | Tetrakis[methylene-3(3,5-di-tert.butyl-4-hydroxyphenyl) propionate]methane. | 0.3 | 1,618 |
| | 13 | $(C_{18}H_{37}-S-CH_2CH_2\overset{O}{\overset{\|}{C}}-O-CH_2)_4 C$ <br> 1,1,3-tris (5-tert.butyl-4-hydroxy-2-methylphenyl) butane | 0.2 <br> 0.3 | >3,000 |
| | 14 | $(C_{18}H_{37}-S-CH_2CH_2\overset{O}{\overset{\|}{C}}-O-CH_2)_3 C-(CH_2OH)$ <br> Tetrakis[methylene-3(3,5-di-tert.butyl-4-hydroxyphenyl)propionate]methane. | 0.2 <br> 0.1 | 3,000 |

Example III-A

Tests similar to those in Example II-A were made on another group of stabilizers.

| Run number | | | | Resistance to thermal |
|---|---|---|---|---|
| Reference | Sample | Stabilizer | Percent | aging (hours) |
| 1 | | None | | <3 |
| | 1 | Bis (ethylene-3-octylthiopropionate) sulfide | 0.3 | 148 |
| | 2 | Bis (ethylene-3-dodecylthiopropionate) sulfide | 0.3 | 97 |
| | 3 | Bis (ethylene-3-octadecylthiopropionate) sulfide. | 0.3 | 134 |
| 2 | | n-Octadecyl-3-(3,5-di-tert. butyl-4-hydroxyphenyl) propionate. | 0.3 | 136 |
| 3 | | 4,4'-butylidenebis (2-tert. butyl-5-methylphenol). | 0.3 | 123 |
| 4 | | 1,1,3-tris (5-tert.butyly-4-hydroxy-2-methylphenyl) butane. | 0.3 | 137 |
| 5 | | 1,3,5-trimethyl-2,4,6-tris (3,5-di-tert.butyl-4-hydroxybenzyl) benzene. | 0.3 | 239 |
| 6 | | Tetrakis [methylene-3-(3,5-di-tert.butyl-4-hydroxyphenyl) propionate] methane. | 0.3 | 1,692 |
| | 4 | Bis (ethylene-3-dodecylthiopropionate) sulfide<br>n-Octadecyl-3-(3,5-di-tert.butyl-4-hydroxyphenyl) propionate. | 0.2<br>0.1 | 743 |
| | 5 | Bis (ethylene-3-dodecylthiopropionate) sulfide.<br>4,4'-butylidenebis (2-tert.butyl-5-methylphenol). | 0.2<br>0.1 | 698 |
| | 6 | Bis (ethylene-3-octadecylthiopropionate) sulfide.<br>1,1,3-tris (5-tert.butyl-4-hydroxy-2-methylphenyl) butane. | 0.2<br>0.1 | 1,630 |
| 1 | | None | | <3 |
| | 7 | Bis (ethylene-3-octadecylthiopropionate) sulfide.<br>1,3,5-trimethyl-2,4,6-tris (3,5-di-tert.butyl-4-hydroxybenzyl) benzene | 0.2<br>0.2 | 2,610 |
| | 8 | Bis (ethylene-3-octadecylthiopropionate) sulfide.<br>Tetrakis [methylene-3-(3,5-di-tert.butyl-4-hydroxyphenyl) propionate] methane. | 0.2<br>0.1 | 3,000 |

Example III-B

Tests similar to those in Example II-B were made on another group of stabilizers.

| Run number | | | | Resistance to thermal |
|---|---|---|---|---|
| Reference | Sample | Stabilizer | Percent | aging (hours) |
| 7 | | None | | <3 |
| | 9 | Bis (ethylene-3-dodecylthiopropionate) sulfide. | 0.3 | 93 |
| | 10 | Bis (ethylene-3-octadecylthiopropionate) sulfide. | 0.3 | 127 |
| 8 | | 1,1,3-tris (5-tert.butyl-4-hydroxy-2-methylphenyl) butane. | 0.3 | 134 |
| 9 | | Tetrakis [methylene-3-(3,5-di-tert.butyl-4-hydroxyphenyl) propionate] methane. | 0.3 | 1,618 |
| | 11 | Bis (ethylene-3-dodecylthiopropionate) sulfide.<br>1,1,3-tris (5-tert.butyl-4-hydroxy-2-methylphenyl) butane. | 0.2<br>0.1 | 739 |
| | 12 | Bis (ethylene-3-octadecylthiopropionate) sulfiide.<br>Tetrakis [methlyene-3-(3,5-di-tert.butyl-4-hydroxyphenyl) propionate] methane. | 0.2<br>0.1 | >3,000 |

Example IV-A

Tests similar to those in Example II-A were made on another group of stabilizers.

| Run Number | | | | Resistance to thermal |
|---|---|---|---|---|
| Reference | Sample | Stabilizer | Percent | aging (hours) |
| 1 | | None | | <3 |
| 2 | | $\left( HSCH_2CH_2\overset{O}{\underset{\|}{C}}-O-CH_2 \right)_3 C-C_2H_5$ | 0.3 | <3 |
| | 1 | $\left( C_8H_{17}-S-CH_2CH_2\overset{O}{\underset{\|}{C}}-O-CH_2 \right)_3 C-C_2H_5$ | 0.3 | 107 |
| | 2 | $\left( C_{12}H_{25}-S-CH_2CH_2\overset{O}{\underset{\|}{C}}-O-CH_2 \right)_3 C-C_2H_5$ | 0.3 | 113 |
| | 3 | $\left( C_{12}H_{25}-S-CH_2CH_2\overset{O}{\underset{\|}{C}}-O-CH_2 \right)_3 C-CH_3$ | 0.3 | 112 |
| | 4 | $\left( C_{18}H_{37}-S-CH_2CH_2\overset{O}{\underset{\|}{C}}-O-CH_2 \right)_3 C-C_2H_5$ | 0.3 | 175 |
| | 5 | $C_{18}H_{37}-S-CH_2CH_2\overset{O}{\underset{\|}{C}}-O-CH_2-\underset{\underset{C_2H_5}{\|}}{C}\left(CH_2OH\right)_2$ | 0.3 | 42 |
| | 6 | $\left( C_{12}H_{25}-S-\underset{\underset{CH_3}{\|}}{CH}CH_2\overset{O}{\underset{\|}{C}}-O-CH_2 \right)_3 C-C_2H_5$ | 0.3 | 132 |
| | 7 | $\left( C_{12}H_{25}-S-CH_2\overset{CH_3}{\underset{\|}{CH}}\overset{O}{\underset{\|}{C}}-O-CH_2 \right)_3 C-C_2H_5$ | 0.3 | 148 |

Example IV-A—Continued

| Run Number | | Stabilizer | Percent | Resistance to thermal aging (hours) |
|---|---|---|---|---|
| Reference | Sample | | | |
| | 8 | $(C_{12}H_{25}-S-CH_2CH_2CH_2\overset{O}{\overset{\|}{C}}-O-CH_2\overset{}{)_3}-C-C_2H_5$ | 0.3 | 143 |
| 3 | | n-Octadecyl-3-(3,5-di-tert.butyl-4-hydroxyphenyl) propionate | 0.3 | 136 |
| 4 | | 4,4'-butylidenebis (2-tert.butyl-5-methylphenol) | 0.3 | 123 |
| 5 | | 1,1,3-tris (5-tert.butyl-4-hydroxy-2-methylphenyl) butane | 0.3 | 137 |
| 6 | | 1,3,5-trimethyl-2,4,6-tris (3,5-di-tert.butyl-4-hydroxybenzyl) benzene | 0.3 | 239 |
| 7 | | Tetrakis [methylene-3-(3,5-di-tert.butyl-4-hydroxyphenyl) propionate] methane | 0.3 | 1,692 |
| | 9 | $(C_{12}H_{25}-S-CH_2CH_2\overset{O}{\overset{\|}{C}}-O-CH_2)_3-C-C_2H_5$ <br> n-Octadecyl-3-(3,5-di-tert.butyl-4-hydroxyphenyl) propionate | 0.2 <br> 0.1 | >3,000 |
| | 10 | $(C_{12}H_{25}-S-\overset{CH_3}{\overset{\|}{C}H}CH_2\overset{O}{\overset{\|}{C}}-O-CH_2)_3-C-C_2H_5$ <br> 4,4'-butylidenebis (2-tert.butyl-5-methylphenol) | 0.2 <br> 0.1 | >3,000 |
| | 11 | $(C_{18}H_{37}-S-\overset{CH_3}{\overset{\|}{C}H}CH_2\overset{O}{\overset{\|}{C}}-O-CH_2)_3-C-C_2H_5$ <br> 1,1,3-tris (5-tert.butyl-4-hydroxy-2-methylphenyl) butane | 0.2 <br> 0.1 | >3,000 |
| | 12 | $(C_{12}H_{25}-S-\overset{CH_3}{\overset{\backslash}{C}H_2}CH\overset{O}{\overset{\|}{C}}-O-CH_2)_3-C-C_2H_5$ <br> 1,3,5-trimethyl-2,4,6-tris (3,5-di-tert.butyl-4-hydroxybenzyl) benzene | 0.2 <br> 0.1 | >3,000 |
| | 13 | $(C_{12}H_{25}-S-CH_2CH_2CH_2\overset{O}{\overset{\|}{C}}-O-CH_2)_3-C-C_2H_5$ <br> Tetrakis [methylene-3-(3,5-di-tert.butyl-4-hydroxyphenyl) propionate] methane | 0.2 <br> 0.1 | >3,000 |

Example IV-B

Tests similar to those in Example II-B were made on another group of stabilizers.

| Run Number | | Stabilizer | Percent | Resistance to thermal aging (hours) |
|---|---|---|---|---|
| Reference | Sample | | | |
| 8 | | None | | <3 |
| | 14 | $(C_{12}H_{25}-S-CH_2CH_2\overset{O}{\overset{\|}{C}}-O-CH_2)_3-C-C_2H_5$ | 0.3 | 106 |
| | 15 | $(C_{12}H_{25}-S-\overset{CH_3}{\overset{\|}{C}H}CH_2\overset{O}{\overset{\|}{C}}-O-CH_2)_3-C-C_2H_5$ | 0.3 | 130 |
| 9 | | 1,1,3-tris (5-tert.butyl-4-hydroxy-2-methylphenyl) butane | 0.3 | 134 |
| 10 | | Tetrakis [methylene-3-(3,5-di-tert.butyl 4-hydroxyphenyl) propionate] methane | 0.3 | 1,618 |
| | 16 | $(C_{12}H_{25}-S-CH_2CH_2\overset{O}{\overset{\|}{C}}-O-CH_2)_3-C-C_2H_5$ <br> 1,1,3-tris (5-tert.butyl-4-hydroxy-2-methylphenyl) butane | 0.2 <br> 0.1 | >3,000 |
| | 17 | $(C_{12}H_{25}-S-\overset{CH_3}{\overset{\|}{C}H}CH_2\overset{O}{\overset{\|}{C}}-O-CH_2)_3-C-C_2H_5$ <br> Tetrakis [methylene-3-(3,5-di-tert.butyl-4-hydroxyphenyl) propionate] methane | 0.2 <br> 0.1 | >3,000 |

Example V-A

Tests similar to those in Example II-A were made on another group of stabilizers.

| Run number | | | | |
|---|---|---|---|---|
| Reference | Sample | Stabilizer | Percent | Resistance to thermal aging (hours) |
| 1 | | None | | <3 |
| 2 | | $HSCH_2CH_2-\overset{O}{\underset{\|}{C}}-O-CH_2$<br>$HSCH_2CH_2-\overset{O}{\underset{\|}{C}}-O-CH$<br>$HSCH_2CH_2-\overset{O}{\underset{\|}{C}}-O-CH_2$ | 0.3 | <3 |
| | 1 | $C_8H_{17}-S-CH_2CH_2\overset{O}{\underset{\|}{C}}-O-CH_2$<br>$C_8H_{17}-S-CH_2CH_2-\overset{O}{\underset{\|}{C}}-O-CH$<br>$C_8H_{17}-S-CH_2CH_2-\overset{O}{\underset{\|}{C}}-O-CH_2$ | 0.3 | 97 |
| | 2 | $C_{12}H_{25}-S-CH_2CH_2\overset{O}{\underset{\|}{C}}-O-CH_2$<br>$C_{12}H_{25}-S-CH_2CH_2\overset{O}{\underset{\|}{C}}-O-CH$<br>$C_{12}H_{25}-S-CH_2CH_2\overset{O}{\underset{\|}{C}}-O-CH_2$ | 0.3 | 103 |
| | 3 | $C_{18}H_{37}-S-CH_2CH_2\overset{O}{\underset{\|}{C}}-O-CH_2$<br>$C_{18}H_{37}-S-CH_2CH_2\overset{O}{\underset{\|}{C}}-O-CH$<br>$C_{18}H_{37}-S-CH_2CH_2\overset{O}{\underset{\|}{C}}-O-CH_2$ | 0.3 | 136 |
| | 4 | $C_{18}H_{37}-S-CH_2CH_2\overset{O}{\underset{\|}{C}}-O-CH_2$<br>$HO-CH$<br>$HO-CH_2$ | 0.3 | 32 |
| | 5 | $C_{12}H_{25}-S-\underset{CH_3}{\overset{\|}{CH}}-CH_2-\overset{O}{\underset{\|}{C}}-O-CH_2$<br>$C_{12}H_{25}-S-\underset{CH_3}{\overset{\|}{CH}}-CH_2-\overset{O}{\underset{\|}{C}}-O-CH$<br>$C_{12}H_{25}-S-\underset{CH_3}{\overset{\|}{CH}}CH_2-\overset{O}{\underset{\|}{C}}-O-CH_2$ | 0.3 | 125 |
| | 6 | $C_{12}H_{25}-S-CH_2\underset{CH_3}{\overset{\|}{CH}}-\overset{O}{\underset{\|}{C}}-O-CH_2$<br>$C_{12}H_{25}-S-CH_2\underset{CH_3}{\overset{\|}{CH}}-\overset{O}{\underset{\|}{C}}-O-CH$<br>$C_{12}H_{25}-S-CH_2\underset{CH_3}{\overset{\|}{CH}}-\overset{O}{\underset{\|}{C}}-O-CH_2$ | 0.3 | 128 |

Example V-A—Continued

| Run number | | Stabilizer | Percent | Resistance to thermal aging (hours) |
|---|---|---|---|---|
| Reference | Sample | | | |
| | 7 | $C_{12}H_{25}-S-CH_2CH_2CH_2\overset{O}{\overset{\|}{C}}-O-CH_2$<br>$C_{12}H_{25}-S-CH_2CH_2CH_2-\overset{O}{\overset{\|}{C}}-O-CH$<br>$C_{12}H_{25}-S-CH_2CH_2CH_2-\overset{O}{\overset{\|}{C}}-O-CH_2$ | 0.3 | 126 |
| 3 | | n-Octadecyl-3-(3,5-di-tert.butyl-4-hydroxyphenyl) propionate. | 0.3 | 136 |
| 4 | | 4,4'-butylidenebis (2-tert.butyl-5-methylphenol). | 0.3 | 123 |
| 5 | | 1,1,3-tris (5-tert.butyl-4-hydroxy-2-methylphenyl) butane. | 0.3 | 137 |
| 6 | | 1,3,5-trimethyl-2,4,6-tris-(3,5-ditert.butyl-4-hydroxy-benzyl) benzene. | 0.3 | 239 |
| 7 | | Tetrakis [methylene-3-(3,5-di-tert.butyl-4-hydroxyphenyl) propionate] methane. | 0.3 | 1,692 |
| | 8 | $\begin{cases} C_{12}H_{25}-S-CH_2CH_2\overset{O}{\overset{\|}{C}}-O-CH_2 \\ C_{12}H_{25}-S-CH_2CH_2\overset{O}{\overset{\|}{C}}-O-CH \\ C_{12}H_{25}-S-CH_2CH_2\overset{O}{\overset{\|}{C}}-O-CH_2 \\ \text{n-Octadecyl-3-(3,5-di-tert.butyl-4-hydroxyphenyl) propionate.} \end{cases}$ | $\begin{cases} 0.2 \\ \\ \\ 0.1 \end{cases}$ | >3,000 |
| | 9 | $\begin{cases} C_{12}H_{25}-S-\overset{CH_3}{\overset{\|}{C}H}CH_2\overset{O}{\overset{\|}{C}}-O-CH_2 \\ C_{12}H_{25}-S-\overset{CH_3}{\overset{\|}{C}H}CH_2\overset{O}{\overset{\|}{C}}-O-CH \\ C_{12}H_{25}-S-\overset{CH_3}{\overset{\|}{C}H}CH_2\overset{O}{\overset{\|}{C}}-O-CH_2 \\ \text{4,4'-butylidenebis (2-tert.butyl-5-methylphenol).} \end{cases}$ | $\begin{cases} 0.2 \\ \\ \\ 0.1 \end{cases}$ | >30,00 |
| | 10 | $\begin{cases} C_{18}H_{37}-S-\overset{CH_3}{\overset{\|}{C}H}CH_2\overset{O}{\overset{\|}{C}}-O-CH_2 \\ C_{18}H_{37}-S-\overset{CH_3}{\overset{\|}{C}H}CH_2\overset{O}{\overset{\|}{C}}-O-CH \\ C_{18}H_{37}-S-\overset{CH_3}{\overset{\|}{C}H}CH_2\overset{O}{\overset{\|}{C}}-O-CH_2 \\ \text{1,1,3-tris-(5-tert.butyl-4-hydroxy-2-methylphenyl) butane.} \end{cases}$ | $\begin{cases} 0.2 \\ \\ \\ 0.1 \end{cases}$ | >3,000 |
| | 11 | $\begin{cases} C_{12}H_{25}-S-CH_2\overset{CH_3}{\overset{\|}{C}H}-\overset{O}{\overset{\|}{C}}-O-CH_2 \\ C_{12}H_{25}-S-CH_2\overset{CH_3}{\overset{\|}{C}H}-\overset{O}{\overset{\|}{C}}-O-CH \\ C_{12}H_{25}-S-CH_2\overset{CH_3}{\overset{\|}{C}H}-\overset{O}{\overset{\|}{C}}-O-CH_2 \\ \text{1,3,5-trimethyl-2,4,6-tris-(3,5-di-tert.butyl-4-hydroxybenzyl) benzene.} \end{cases}$ | $\begin{cases} 0.2 \\ \\ \\ 0.1 \end{cases}$ | >3,000 |
| | 12 | $\begin{cases} C_{12}H_{25}-S-CH_2CH_2CH_2\overset{O}{\overset{\|}{C}}-O-CH_2 \\ C_{12}H_{25}-S-CH_2CH_2CH_2\overset{O}{\overset{\|}{C}}-O-CH \\ C_{12}H_{25}-S-CH_2CH_2CH_2\overset{O}{\overset{\|}{C}}-O-CH_2 \\ \text{Tetrakis [methylene-3-(3,5-di-tert.butyl-4-hydroxyphenyl) propionate] methane.} \end{cases}$ | $\begin{cases} 0.2 \\ \\ \\ 0.1 \end{cases}$ | >3,000 |

Example V-B

Tests similar to those in Example II-B were made on another group of stabilizers.

| Run number Reference | Sample | Stabilizer | Percent | Resistance to thermal aging (hours) |
|---|---|---|---|---|
| 8 | | | | <3 |
| | 13 | $C_{12}H_{25}-S-CH_2CH_2\overset{O}{\underset{\|}{C}}-O-CH_2$<br>$C_{12}H_{25}-S-CH_2CH_2\overset{O}{\underset{\|}{C}}-O-CH$<br>$C_{12}H_{25}-S-CH_2CH_2\overset{O}{\underset{\|}{C}}-O-CH_2$ | 0.3 | 100 |
| | 1 | $C_{12}H_{25}-S-\overset{CH_3}{\underset{\|}{C}H}CH_2\overset{O}{\underset{\|}{C}}-O-CH_2$<br>$C_{12}H_{25}-S-\overset{CH_3}{\underset{\|}{C}H}CH_2\overset{O}{\underset{\|}{C}}-O-CH$<br>$C_{12}H_{25}-S-\overset{CH_3}{\underset{\|}{C}H}CH_2\overset{O}{\underset{\|}{C}}-O-CH_2$ | 0.3 | 120 |
| 9 | | 1,1,3-tris-(5-tert.butyl-4-hydroxy-2-2-methylphenyl) butane. | 0.3 | 134 |
| 10 | | Tetrakis [methylene-3-(3,5-di-tert.butyl-4-hydroxyphenyl) propionate] methane. | 0.3 | 1,618 |
| | 15 | $C_{12}H_{25}-S-CH_2CH_2\overset{O}{\underset{\|}{C}}-O-CH_2$<br>$C_{12}H_{25}-S-CH_2CH_2\overset{O}{\underset{\|}{C}}-O-CH$<br>$C_{12}H_{25}-S-CH_2CH_2\overset{O}{\underset{\|}{C}}-O-CH_2$<br>1,1,3-tris-(5-tert.butyl-4-hydroxy-2-methylphenyl) butane. | 0.2<br><br><br><br>0.1 | >3000 |
| | 16 | $C_{12}H_{25}-S-\overset{CH_3}{\underset{\|}{C}H}CH_2\overset{O}{\underset{\|}{C}}-O-CH_2$<br>$C_{12}H_{25}-S-\overset{CH_3}{\underset{\|}{C}H}CH_2\overset{O}{\underset{\|}{C}}-O-CH$<br>$C_{12}H_{25}-S-\overset{CH_3}{\underset{\|}{C}H}CH_2\overset{O}{\underset{\|}{C}}-O-CH_2$<br>Tetrakis [methylene-3-(3,5-di-tert.butyl-4-hydroxyphenyl) propionate] methane. | 0.2 | >3000 |

Example VI-A

Tests similar to those in Example II-A were made on another group of stabilizers.

| Run Number Reference | Sample | Stabilizer | Percent | Resistance to thermal aging (hours) |
|---|---|---|---|---|
| 1 | | None | | <3 |
| 2 | | $\left(HS\overset{CH_3}{\underset{\|}{C}H}CH_2\overset{O}{\underset{\|}{C}}-O-CH_2\right)_4 C$ | 0.3 | <3 |
| | 1 | $\left(C_8H_{17}-S-\overset{CH_3}{\underset{\|}{C}H}CH_2\overset{O}{\underset{\|}{C}}-O-CH_2\right)_4 C$ | 0.3 | 125 |

Example VI-A—Continued

| Run Number | | Stabilizer | Percent | Resistance to thermal aging (hours) |
|---|---|---|---|---|
| Reference | Sample | | | |
| | 2 | $\left(C_{12}H_{25}-S-\underset{CH_3}{\underset{|}{C}H}CH_2\underset{O}{\overset{\|}{C}}-O-CH_2\right)_4 C$ | 0.3 | 131 |
| | 3 | $\left(C_{18}H_{37}-S-\underset{CH_3}{\underset{|}{C}H}CH_2\underset{O}{\overset{\|}{C}}-O-CH_2\right)_4 C$ | 0.3 | 189 |
| | 4 | $C_{18}H_{37}-S-\underset{CH_3}{\underset{|}{C}H}CH_2\underset{O}{\overset{\|}{C}}-O-CH_2-C-(CH_2OH)_3$ | 0.3 | 48 |
| | 5 | $\left(C_{12}H_{25}-S-CH_2\underset{CH_3}{\underset{|}{C}H}-\underset{O}{\overset{\|}{C}}-O-CH_2\right)_4 C$ | 0.3 | 137 |
| | 6 | $\left(C_{12}H_{25}-S-CH_2CH_2CH_2\underset{O}{\overset{\|}{C}}-O-CH_2\right)_4 C$ | 0.3 | 134 |
| 3 | | n-Octadecyl-3-(3,5-di-tert.butyl-4-hydroxyphenyl) propionate. | 0.3 | 136 |
| 4 | | 4,4'-butylidenebis(2-tert.butyl-5-methylphenol). | 0.3 | 123 |
| 5 | | 1,1,3-tris(5-tert.butyl-4-hydroxy-2-methylphenyl) butane. | 0.3 | 137 |
| 6 | | 1,3,5-trimethyl-2,4,6-tris(3,5-di-tert.butyl-4-hydroxybenzyl) benzene. | 0.3 | 239 |
| 7 | | Tetrakis[methylene-3-(3,5-di-tert.butyl-4-hydroxyphenyl) propionate]methane. | 0.3 | 1,692 |
| | 7 | $\left(C_{12}H_{25}-S-\underset{CH_3}{\underset{|}{C}H}CH_2\underset{O}{\overset{\|}{C}}-O\right)_4 C$ <br> n-Octadecyl-3-(3,5-di-tert.butyl-4-hydroxyphenyl) propionate. | 0.2 <br><br> 0.1 | 3,000 |
| | 8 | $\left(C_{12}H_{25}-S-\underset{CH_3}{\underset{|}{C}H}CH_2-\underset{O}{\overset{\|}{C}}-O\right)_4 C$ <br> 4,4'-butylidenebis(2-tert.butyl-5-methylphenol). | 0.2 <br><br> 0.1 | >3,000 |
| | 9 | $\left(C_{18}H_{37}-S-\underset{CH_3}{\underset{|}{C}H}CH_2-\underset{O}{\overset{\|}{C}}-O\right)_4 C$ <br> 1,1,3-tris(5-tert.butyl-4-hydroxy-2-methylphenyl) butane. | 0.2 <br><br> 0.1 | >3,000 |
| | 10 | $\left(C_{12}H_{25}-S-CH_2\underset{CH_3}{\underset{|}{C}H}-\underset{O}{\overset{\|}{C}}-O-CH_2\right)_4 C$ <br> 1,3,5-trimethyl-2,4,6-tris(3,5-di-tert.butyl-4-hydroxybenzyl) benzene. | 0.2 <br><br> 0.1 | >3,000 |
| | 11 | $\left(C_{12}H_{25}-S-CH_2CH_2CH_2\underset{O}{\overset{\|}{C}}-CH_2\right)_4 C$ <br> Tetrakis[methylene-3-(3,5-di-tert.butyl-4-hydroxyphenyl) propionate] methane. | 0.2 <br><br> 0.1 | >3,000 |

Example VI-B

Tests similar to those in Example II-B were made on another group of stabilizers.

| Run Number | | Stabilizer | Percent | Resistance to thermal aging (hours) |
|---|---|---|---|---|
| Reference | Sample | | | |
| 8 | | None | | <3 |
| | 12 | $\left(C_{12}H_{25}-S-\underset{CH_3}{\underset{|}{C}H}CH_2\underset{O}{\overset{\|}{C}}-O-CH_2\right)_4 C$ | 0.3 | 128 |
| | 13 | $\left(C_{12}H_{25}-S-CH_2CH_2CH_2\underset{O}{\overset{\|}{C}}-O-CH_2\right)_4 C$ | 0.3 | 130 |

Example VI-B—Continued

| Run Number | | | | |
|---|---|---|---|---|
| Reference | Sample | Stabilizer | Percent | Resistance to thermal aging (hours) |
| 9 | | 1,1,3-tris(5-tert.butyl-4-hydroxy-2-methylphenyl) butane. | 0.3 | 134 |
| 10 | | Tetrakis[methylene-3-(3,5-di-tert.butyl-4-hydroxyphenyl)propionate] methane. | 0.3 | 1,618 |
| | 14 | $(C_{12}H_{25}-S-\underset{CH_3}{\underset{|}{C}}HCH_2\overset{O}{\overset{\|}{C}}-O-CH_2)_4 C$ <br> 1,1,3-tris(5-tert.butyl-4-hydroxy-2-methylphenyl) butane. | 0.1 | >3,000 |
| | 15 | $(C_{12}H_{25}-S-CH_2CH_2CH_2\overset{O}{\overset{\|}{C}}-O-CH_2)_4 C$ <br> Tetrakis[methylene-3-(3,5-di-tert.butyl-4-hydroxyphenyl)propionate] methane. | 0.1 | >3,000 |

Example VII-A

Tests similar to those in Example II-A were made on another group of stabilizers.

| Run Number | | | | |
|---|---|---|---|---|
| Reference | Sample | Stabilizer | Percent | Resistance to thermal aging (hours) |
| 1 | | | | <3 |
| | 1 | Ethylene-bis(3-dodecylthiobutyrate) | 0.3 | 50 |
| | 2 | Ethylene-bis(3-octadecylthioisobutyrate) | 0.3 | 58 |
| | 3 | Ethylene-bis(4-octadecylthiobutyrate) | 0.3 | 51 |
| | 4 | Propylene-bis(3-octadecylthiobutyrate) | 0.3 | 57 |
| | 5 | Octamethylene-bis(3-octadecyltiobutyrate) | 0.3 | 89 |
| | 6 | Bis(ethylene-3-octadecylthiobutyrate)sulfide | 0.3 | 93 |
| | 7 | Bis(propylene-3-octadecylthiobutyrate)sulfide | 0.3 | 95 |
| 2 | | n-Octadecyl-3-(3,5-di-tert.butyl-4-hydroxyphenyl)propionate. | 0.3 | 136 |
| 3 | | 4,4'-butylidenebis(2-tert.butyl-5-methylphenol). | 0.3 | 123 |
| 4 | | 1,1,3-tris(5-tert.butyl-4-hydroxy-2-methylphenyl)butane. | 0.3 | 137 |
| 5 | | 1,3,5-trimethyl-2,4,6-tris(3,5-di-tert.butyl-4-hydroxybenzyl)benzene. | 0.3 | 239 |
| 6 | | Tetrakis[methylene-3-(3,5-di-tert.butyl-4-hydroxyphenyl)propionate]methane. | 0.3 | 1,692 |
| | 8 | Ethylene-bis(3-dodecylthiobutyrate) <br> n-Octadecyl-3-(3,5-di-tert.butyl-4-hydroxyphenyl)propionate. | 0.2 <br> 0.1 | 570 |
| | 9 | Ethylene-bis(3-octadecylthioisobutyrate) <br> 4,4-butylidenebis(2-tert.butyl-5-methylphenol). | 0.2 <br> 0.1 | 1,240 |
| | 10 | Ethylene-bis(4-octadecylthio-butyrate) <br> 1,1,3-tris(5-tert.butyl-4-hydroxy-2-methylphenyl)butane. | 0.2 <br> 0.1 | 1,410 |
| | 11 | Propylene-bis(3-octadecylthio-butyrate) <br> 1,3,5-trimethyl-2,4,6-tris(3,5-di-tert.butyl-4-hydroxybenzyl)benzene. | 0.2 <br> 0.1 | 2,019 |
| | 12 | Octamethylene-bis(3-octadecylthio-butyrate) <br> Tetrakis[methylene-3-(3,5-di-tert.butyl-4-hydroxyphenyl)propionate]methane. | 0.2 <br> 0.1 | >3,000 |
| | 13 | Bis(ethylene-3-octadecylthio-butyrate) sulfide <br> Tetrakis[methylene-3-(3,5-di-tert.butyl-4-hydroxyphenyl)propionate]methane. | 0.2 <br> 0.1 | >3,000 |
| | 14 | Bis(propylene-3-octadecylthio-butyrate)sulfide <br> Tetrakis[methylene-3-(3,5-di-tert.butyl-4-hydroxyphenyl)propionate]methane. | 0.2 <br> 0.1 | >3,000 |

Example VII-B

Tests similar to those in Example II-B were made on another group of stabilizers.

| Run Number | | | | |
|---|---|---|---|---|
| Reference | Sample | Stabilizer | Percent | Resistance to thermal aging (hours) |
| 7 | | None | | <3 |
| | 15 | Ethylene-bis(4-octadecylthio-butyrate) | 0.3 | 50 |
| | 16 | Bis(ethylene-3-octadecylthio-butyrate) sulfide | 0.3 | 89 |
| 8 | | 1,1,3-tris(5-tert.butyl-4-hydroxy-2-methylphenyl)butane. | 0.3 | 134 |
| 9 | | Tetrakis[methylene-3-(3,5-di-tert.butyl-4-hydroxyphenyl)propionate] methane. | 0.3 | 1,618 |
| | 17 | Ethylene-bis(4-octadecylthio-butyrate) <br> 1,1,3-tris(5-tert.butyl-4-hydroxy-2-methylphenyl)butane. | 0.2 <br> 0.1 | 1,283 |
| | 18 | Bis(ethylene-3-octadecylthio-butyrate) sulfide <br> Tetrakis[methylene-3-(3,5-di-tert.butyl-4-hydroxyphenyl)propionate] methane. | 0.2 <br> 0.1 | >3,000 |

Example VIII-A

The tests in this example and following Example VIII-B are intended to demonstrate the stabilizing activity of the esters of the polyol II employed with a phenolic antioxidant.

Accordingly, the runs in which the esters are employed singly are classified as "Reference."

Tests similar to those in Example II A wert made on another group of combined stabilizers.

| Run Number | | Stabilizer | Percent | Resistance to thermal aging (hours) |
|---|---|---|---|---|
| Reference | Sample | | | |
| 1 | | None | | <3 |
| 2 | | Ethylene-bis(3-octadecylthiopropionate) | 0.3 | 52 |
| 3 | | Propylene-bis(3-octadecylthiopropionate) | 0.3 | 55 |
| 4 | | Pentamethylene-bis(3-dodecylthiopropionate) | 0.3 | 96 |
| 5 | | n-Octadecyl-3-(3,5-di-tert.butyl-4-hydroxyphenyl) propionate | 0.3 | 136 |
| 6 | | 1,1,3-tris(5-tert.butyl-4-hydroxy-2-methylphenyl) butane | 0.3 | 137 |
| 7 | | 1,3,5-trimethyl-2,4,6-tris(3,5-di-tert.butyl-4-hydroxybenzyl) benzene | 0.3 | 239 |
| 8 | | Tetrakis[methylene-3-(3,5-di-tert.butyl-4-hydroxyphenyl)propionate] methane | 0.3 | 1,692 |
| | 1 | {Ethylene-bis(3-octadecylthiopropionate) / n-Octadecyl-3-(3,5-di-tert.butyl-4-hydroxyphenyl) propionate} | 0.2 / 0.1 | 1,246 |
| | 2 | {Ethylene-bis(3-octadecylthio-propionate) / 1,1,3-tris(5-tert.butyl-4-hydroxy-2-methylphenyl) butane} | 0.2 / 0.1 | 1,370 |
| | 2 | {Propylene-bis(3-octadecylthio-propionate) / 1,3,5-trimethyl-2,4,6-tris(3,5-di-tert.butyl-4-hydroxybenzyl) benzene} | 0.2 / 0.1 | 1,920 |
| | 4 | {Pentamethylene-bis(3-dodecylthio-propionate) / Tetrakis[methylene-3-(3,5-di-tert.-butyl-4-hydroxyphenyl)propionate] methane} | 0.2 / 0.1 | >3,000 |

Example VIII-B

Tests similar to those in Example II-B were made on another group of combined stabilizers.

| Run Number | | Stabilizer | Percent | Resistance to thermal aging (hours) |
|---|---|---|---|---|
| Reference | Sample | | | |
| 9 | | None | | <3 |
| 10 | | Ethylene-bis(3-octadecylthio-propionate) | 0.3 | 50 |
| 11 | | Propylene-bis(3-octadecylthio-propionate) | 0.3 | 52 |
| 12 | | 1,1,3-tris(5-tert.butyl-4-hydroxy-2-methylphenyl) butane | 0.3 | 134 |
| 13 | | Tetrakis[methylene-3-(3,5-di-tert.butyl-4-hydroxyphenyl]propionate) methane | 0.3 | 1,618 |
| | 5 | {Ethylene-bis(3-octadecylthio-propionate) / 1,1,3-tris(5-tert.butyl-4-hydroxy-2-methylphenyl) butane} | 0.2 / 0.1 | 1,347 |
| | 6 | {Propylene-bis(3-octadecylthio-propionate) / Tetrakis[methylene-3-'3,5-di-tert.butyl-4-hydroxyphenyl]propionate)methane} | 0.2 / 0.1 | >3,000 |

We claim:
1. A polyolefin resin composition stabilized against thermal aging which comprises a polyolefin resin and a stabilizing amount of a stabilizer, said stabilizer being selected from the group consisting of

(1) $R-SC_nH_{2n}COOR'OOCC_nH_{2n}SR$
(2) $RSC_nH_{2n}COOC_mH_{2m}SC_mH_{2m}OOCC_nH_{2n}SR$
(3) $R''C(CH_2OX)_3$
(4) 
$$\begin{array}{c} CH_2OX \\ | \\ HC-OX \\ | \\ CH_2OX \end{array}$$

and (5) $C(CH_2OX)_4$ wherein

R is an alkyl of 8 to 30 carbon atoms,
m and n are each integers of 2 or 3,
R' is an alkylene containing 2 to 12 carbon atoms,
R'' is an alkyl containing 1 to 20 carbon atoms,
X is hydrogen or $-OC-C_nH_{2n}SR$, at least one of which is $-OCC_nH_{2n}SR$,
the $R_1$, R' and R'' moieties in one compound being the same or different.

2. A polyolefin resin composition as claimed in claim 1 in which said ester has the formula $$R-SC_nH_{2n}COOR'-OOCC_nH_{2n}SR$$

wherein R, R' and n are as defined in claim 1.

3. A polyolefin resin composition as claimed in claim 1 in which said ester has the formula $$R-SC_nH_{2n}COOC_mH_{2m}-S-C_mH_{2m}OOCC_nH_{2n}SR$$

wherein R, n and m are as defined in claim 1.

4. A polyolefin resin composition as claimed in claim 1 in which said ester is selected from the group consisting of Formula 3, 4 or 5.

5. A polyolefin resin composition stabilized against thermal aging which comprises a polyolefin resin and a stabilizing amount of a stabilizer, said stabilizer being selected from the group consisting of (1) $R-SC_nH_{2n}COOR'OOCC_nH_{2n}SR$
(2) $RSC_nH_{2n}COOC_mH_{2m}SC_mH_{2m}OOCC_nH_{2n}SR$
(3) $R''C(CH_2OX)_3$ (4)

and (5) C(CH$_2$OX)$_4$ wherein

R is an alkyl of 8 to 30 carbon atoms, m and n are each integers of 2 or 3,

R' is an alkylene containing 2 to 12 carbon atoms,

R" is an alkyl containing 1 to 20 carbon atoms,

X is hydrogen or —OC—C$_n$H$_{2n}$SR, at least one of which is —OCC$_n$H$_{2n}$SR, the R$_1$, R' and R" moieties in one compound being the same or different and (B) a phenolic antioxidant which is a hindered phenol compound.

6. A polyolefin resin composition as claimed in claim 5 in which said ester is Formula 1 or 2.

7. A polyolefin resin composition as claimed in claim 1 in which said polyolefin resin is selected from the group consisting of homopolymers and copolymers of propylene and ethylene.

References Cited

UNITED STATES PATENTS

| | | | |
|---|---|---|---|
| 2,601,063 | 6/1952 | Smith et al. | 260—481 |
| 2,603,653 | 7/1952 | Kosmin et al. | 260—481 |
| 2,603,654 | 7/1952 | Kosmin | 252—48.6 |
| 3,144,422 | 8/1964 | Homberg | 260—45.85 |
| 3,158,576 | 11/1964 | Rudel et al. | 260—481 |
| 3,305,580 | 2/1967 | Homberg et al. | 260—45.85 |

DONALD E. CZAJA, Primary Examiner

V. P. HOKE, Assistant Examiner

U.S. Cl. X.R.

260—45.95